United States Patent
Galle et al.

(10) Patent No.: US 12,473,169 B2
(45) Date of Patent: Nov. 18, 2025

(54) MEASUREMENT VALUE CORRECTION OF A REFERENCE MARK ON A MATERIAL WEB

(71) Applicant: Siemens Aktiengesellschaft, Munich (DE)

(72) Inventors: Alexander Galle, Treuen (DE); Thomas Eckl, Hirschau (DE)

(73) Assignee: Siemens Aktiengesellschaft, Munich (DE)

(*) Notice: Subject to any disclaimer, the term of this patent is extended or adjusted under 35 U.S.C. 154(b) by 547 days.

(21) Appl. No.: 17/956,287

(22) Filed: Sep. 29, 2022

(65) Prior Publication Data
US 2023/0097600 A1    Mar. 30, 2023

(30) Foreign Application Priority Data
Sep. 30, 2021 (EP) ..................................... 21200231

(51) Int. Cl.
*B65H 23/188* (2006.01)
*B41F 13/02* (2006.01)
(Continued)

(52) U.S. Cl.
CPC ....... *B65H 23/1882* (2013.01); *B65H 23/046* (2013.01); *B41F 13/025* (2013.01); *B41F 33/0081* (2013.01); *B41P 2213/90* (2013.01)

(58) Field of Classification Search
CPC combination set(s) only.
See application file for complete search history.

(56) References Cited

U.S. PATENT DOCUMENTS

| 6,092,466 A * | 7/2000 | Koch ................... B41F 13/025 |
| | | 101/248 |
| 2011/0203472 A1 | 8/2011 | Shin et al. |

(Continued)

FOREIGN PATENT DOCUMENTS

| DE | 10 2008 062 531 A1 | 6/2010 |
| EP | 3205500 A2 * | 8/2017 .......... B41F 33/0036 |

(Continued)

OTHER PUBLICATIONS

Lee et al., "Register mark measurement errors in high-precision roll-to-roll continuous systems: The effect of register mark geometry on measurement error" Applied Physics Letters 109, 141602 (2016) (Year: 2016).*

*Primary Examiner* — John C Kuan
(74) *Attorney, Agent, or Firm* — Henry M. Felereisen LLC

(57) ABSTRACT

A method for correcting a measurement value of a reference mark on a material web is disclosed. A controller, a machine, a computer program and a computer program product can perform a correction of this type. To improve determination of the position of a reference mark on a material web, a machine in which the material web is moved in a conveying direction has at least one tool that functions in a non-positive locking manner, a second tool that functions in a non-positive locking manner and is located downstream of the first tool in the conveying direction, and a sensor that is located between the two tools. A measurement error in the sensor which arises as a result of an adjustment of the second tool is determined at least approximately at least via parameter values of the second tool. The measurement value is corrected by the measurement error.

6 Claims, 1 Drawing Sheet

(51) Int. Cl.
*B41F 33/00* (2006.01)
*B65H 23/04* (2006.01)

(56) References Cited

U.S. PATENT DOCUMENTS

2018/0079197 A1* 3/2018 Lucas ..................... B41F 13/02
2019/0002227 A1* 1/2019 Zell ................... B65H 23/1882

FOREIGN PATENT DOCUMENTS

| JP | 2003/237033 A | | 8/2003 |
|---|---|---|---|
| JP | 2013132877 A | * | 7/2013 |
| WO | WO 2016/180441 A1 | | 11/2016 |

* cited by examiner

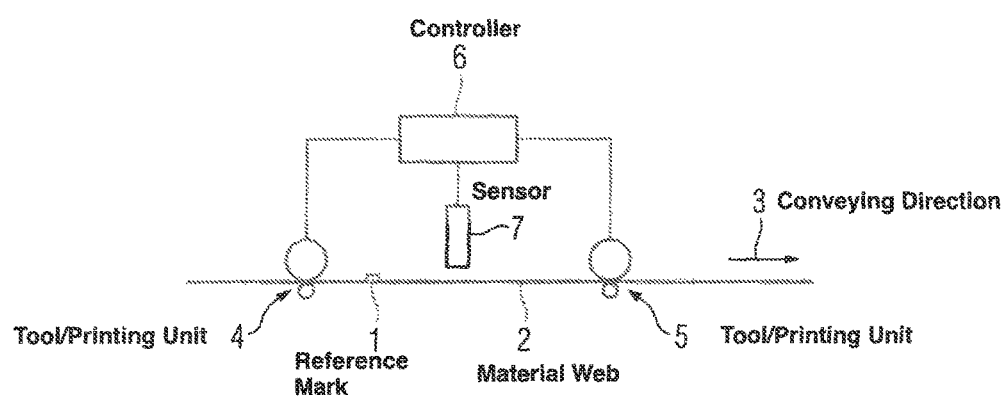

MEASUREMENT VALUE CORRECTION OF A REFERENCE MARK ON A MATERIAL WEB

CROSS-REFERENCES TO RELATED APPLICATIONS

This application claims the priority of European Patent Application, Serial No. 21200231.5, filed Sep. 30, 2021, pursuant to 35 U.S.C. 119(a)-(d), the disclosure(s) of which is/are incorporated herein by reference in its entirety as if fully set forth herein.

BACKGROUND OF THE INVENTION

The Invention relates to a method for correcting a measurement value of a reference mark on a material web. The invention further relates to a controller, a machine, a computer program and a computer program product, which can perform a correction of this type.

The following discussion of related art is provided to assist the reader in understanding the advantages of the invention, and is not to be construed as an admission that this related art is prior art to this invention.

A method of this type can be used anywhere where material webs are processed in multiple steps. In order to process a tensioned material web by rolling it through multiple production stages, (for example in a web printing machine), it is necessary for the individual processing steps (for example the color printing unit) to lie exactly one above the other (for example color register). Web markings (for example print marks) that are applied specifically at regular intervals are used for the angular positioning of the processing tool. The processing requires that the markings are continuously measured rapidly and precisely and that the tool is continuously aligned rapidly and precisely with the marking (for example register control). When tools that function in a non-positive locking manner (for example gravure printing) are in the printing mode (printing position), they can only be adjusted under the influence of a tensile force on the web. The adjustment can be performed either axially (adjustment of the phase position of the shaft) or longitudinally (displacement of the shaft in the conveying direction, for example register roller). In either case, the adjustment of a tool that functions in a non-positive locking manner results in tensioning and stretching problems of the material web.

The register controller of a multi-colored gravure printing installation is considered below. In sequential printing units, the printing cylinder n+1, for example, applies the part print image of the corresponding color separation n+1. The elastic thread model describes the conveying procedure of the printing substrate web in the terms of web stretching and conveying speed. By adjusting the angle of the printing cylinder n+1, the register controller corrects the precise overprinting of the color separations n to n+2. An automatic side effect as a result of a register adjustment is initially the influence on the stretching of directly adjacent register values n and n+2. The web run causes the stretch changes to propagate in adjacent web run sections n+2. Gradually, the stretches balance each other out and a new steady state is realized, in which the stretches of all sections n, n+1 etc. remain identical.

In this case, two measurement principles differ: Firstly, the comparison of two print marks (web-web measurement). The rollers print marks in addition to the print image. These marks are detected by sensors and measured against one another. As a result, the cylinder can be positioned in an optimal manner. Secondly, the comparison of a print mark with the roller rotational angle (web-cylinder measurement). If a printing cylinder does not have a mark or has a mark which is not easily detectable, then the roller rotational angle must be synchronized with a reference mark on the paper. The adjustment influences and falsifies the web-cylinder measurement value. This falsification affects the measurement value both in the preceding and also in the subsequent web section.

A register decoupling strategy to date (cf. for example the solution "DRD" (Dynamic Register Decoupling) in "SIMOTION Print Standard" of the applicant) relates to the avoidance of register errors as a result of a register adjustment. This strategy is also sufficiently precise for web-web measurements. However, when a web-cylinder measurement method is used, the decoupling strategy to date is not sufficient, since the register adjustment automatically falsifies the measurement result and feigns an excessively large register deviation. By virtue of the fact that an incorrect measurement acts against the conveying direction, it has a detrimental effect on the control stability of the entire machine.

In the case of gravure printing units or tools that function in a non-positive locking manner, a change in the print image is generated as a result of stretch changes of the material. In this case, both subsequent printing units and also preceding printing units are influenced. Whereas a solution to the problem already exists (for example "Dynamic Register Control") for the subsequent printing units, a description is to be provided here of the effect of the control variable change on the preceding printing unit, which causes a problem in particular in the case of web-cylinder measurements. The printing unit n+1 changes the rotational angle and changes the stretch state of the material section n . . . n+1 and consequently also the positions of the reference marks on the material. Since the printing unit n using the indirect measurement method is only able to compare the cylinder position with the reference mark, measurement errors consequently occur which generate an error in the print image as they are eliminated.

The incorrect measurement relates in this case solely to the measurement method "web-cylinder measurement" and is not dependent upon the measuring principle of the sensor. The relative register displacement is superimposed in this case by an absolute web displacement.

It would therefore be desirable and advantageous to provide an improved determination of the position of a reference mark on a material web.

SUMMARY OF THE INVENTION

According to one aspect of the invention, a method for correcting a measurement value of a reference mark on a material web which is moved in a conveying direction through a machine having a first tool that functions in a non-positive locking manner and a second tool that functions in a non-positive locking manner and is located downstream of the first tool in the conveying direction, includes recording a measurement value between the first tool and the second tool, wherein an adjustment of the second tool results in the measurement value having a measurement error, determining the measurement error via parameter values of the second tool, and correcting the measurement value by the measurement error.

According to another aspect of the invention, correcting the measurement value by the measurement error can be achieved by a controller, a machine, a computer program and a computer program product.

The measurement error is superimposed on the actual register value in an additive manner and is therefore to be deducted again from the measurement value so as to achieve the correction. In order to calculate the measurement error at least approximately, the time constant T inter alia is determined, the time constant being the quotient of the web length between the two tools and the conveying speed that is determined from parameter values of the second tool. In general:

$$T_{n+1} = L_{B(n,n+1)} / v_{(n,n+1)}.$$

The following incorrect measurement $x_{o(n)}$ occurs at the sensor n (between tool n and tool n+1). The incorrect measurement also includes the web length $L_{S(n)}$ between tool n and the sensor n:

$$x_{o(n)} = x_r p T_{n+1} L_{S(n)} / (1 + p T_{n+1}) L_{B(n,n+1)}$$

The incorrect measurement is a dynamic effect that disappears when stationary. The value of the incorrect measurement is dependent upon the adjustment speed ($dv_n/dt$) and in the case of typical applications amounts temporarily to a maximum of 10% of the measurement value:

$$X_r L_{S(n)} / L_{B(n,n+1)}.$$

The incorrect measurement is superimposed on the actual register value x in an additive manner. This results in an erroneous measurement value $x_m$:

$$X_m = x + x_o.$$

In this case, the incorrect measurement that is continuously calculated from the available parameter values corresponds at least as a good approximation to the actual incorrect measurement. In order to correct the measurement error by compensation, the calculated incorrect measurement is therefore deducted from the measurement value.

Using the solution in accordance with the invention, it is consequently possible to perform the measurement in a more precise manner and consequently also to achieve a more rapid and improved control. In this case, it is not necessary to provide additional sensors, control devices or actuators since only the sensor that is already provided or parameter values that relate to the tools and that are available in a controller are used. Using the proposed solution, the position of the reference mark (register) is therefore determined in a more precise manner and overall the quality of the control is increased.

According to another advantageous feature of the invention, at least the second tool can have at least one cylinder or one roller and a radius and a rotational speed from the at least one cylinder or one roller that can be used as the parameter values. In the case of this typical embodiment of the tool, as is used in printing machines, (for example roller rotation machines), the conveying speed is simply calculated as:

$$V_n = 2\pi R_n n_n.$$

According to another advantageous feature of the invention, at least a further measurement value downstream of the second tool in the conveying direction can be recorded, wherein an adjustment of the second tool results in the further measurement value has a further measurement error. A further measurement error can be determined at least via the parameter values of the second tool, and the further measurement value can be corrected by the further measurement error. Even if conventional solutions are known for the influence of the material web in the subsequent web sections as a result of the adjustment of a tool, the solution in accordance with the invention for the "forwards correction" can be used in a similar manner as illustrated as an alternative or in addition thereto.

According to another aspect of the invention, a controller for a machine in which a material web is moved in a conveying direction, the machine having a first tool that functions in a non-positive locking manner, a second tool that functions in a non-positive locking manner and is located downstream of the first tool in the conveying direction, and at least one sensor that is located between the first tool and the second tool for measuring a reference mark on the material web can be configured to record a measurement value between the first tool and the second tool, wherein an adjustment of the second tool results in the measurement value having a measurement error, determine the measurement error via parameter values of the second tool, and correct the measurement value by the measurement error.

According to still another aspect of the invention, a machine in which a material web is moved in a conveying direction includes a first tool that functions in a non-positive locking manner, a second tool that functions in a non-positive locking manner and is located downstream of the first tool in the conveying direction, at least one sensor that is located between the first tool and the second tool for measuring a reference mark on the material web, and a controller configured to record a measurement value between the first tool and the second tool, wherein an adjustment of the second tool results in the measurement value having a measurement error, determine the measurement error via parameter values of the second tool, and correct the measurement value by the measurement error.

According to still another aspect of the invention, a computer program product embodied in a non-transitory computer readable medium having at least one computer program, that when executed on a computer performs a method for correcting a measurement value of a reference mark on a material web which is moved in a conveying direction through a machine having a first tool that functions in a non-positive locking manner and a second tool that functions in a non-positive locking manner and is located downstream of the first tool in the conveying direction, and includes recording a measurement value between the first tool and the second tool, wherein an adjustment of the second tool results in the measurement value having a measurement error, determining the measurement error via parameter values of the second tool, and correcting the measurement value by the measurement error.

BRIEF DESCRIPTION OF THE DRAWING

Other features and advantages of the invention will be more readily apparent upon reading the following description of currently preferred exemplified embodiment of the invention with reference to the accompanying drawing, in which the sole FIG. 1 shows a schematic illustration of an embodiment in accordance with the invention.

DETAILED DESCRIPTION OF PREFERRED EMBODIMENTS

The depicted embodiment is to be understood as illustrative of the invention and not as limiting in any way. It should also be understood that the FIGURE is not necessarily to scale and that the embodiment may be illustrated by graphic symbols, phantom lines, diagrammatic representations and fragmentary views. In certain instances, details which are not necessary for an understanding of the invention or which render other details difficult to perceive may have been omitted.

Turning now to FIG. 1, there is shown a section of a machine according to the invention in which the tools 4, 5 that function in a non-positive locking manner have two cylinders, as this is the case by way of example in the case of printing units of a printing machine. A material web 2 is moved through the machine in the conveying direction 3; the second tool 5 thus lies downstream of the first tool 4 in the conveying direction 3. A reference mark 1 which is detected by a sensor 7 is applied to the material web 2. In reality, reference marks are usually applied at regular intervals but for the sake of simplicity of the illustration in this case only one reference mark is illustrated. Signals from the sensor 7 and parameter values from the exemplary printing units 4, 5 are processed in a schematically illustrated controller 6, which is why it is emphasized here since an actual controller is often not centrally provided but rather is provided as a complex system—for example as a decoupling network—and/or parts of the controller are arranged decentralized—for example close to the drive or integrated into the drives, which can be advantageous inter alia for rapid data processing.

If the second tool 5 that functions in a non-positive locking manner is now adjusted, then this has an effect on the material web 2 upstream and downstream of the tool 5, which results in a measurement error when the reference mark 1 is measured by the sensor 7 and likewise results in a measurement error in the case of a further sensor (not illustrated here) downstream of the second tool 5 in the conveying direction. Whereas known solutions exist for the subsequent web sections (for example the "Dynamic Register Control"), this is not the case for the preceding web section (in other words between the two illustrated tools 4, 5). Nonetheless, the illustrated method in accordance with the invention can be used in a similar manner also as an alternative or in addition thereto for the error correction and consequently to provide an improved adjustment of a printing cylinder that follows the second tool 5.

It is possible to determine the measurement error (at least as a good approximation) from parameter values of the second printing cylinder 5 such as radius, rotational speed and adjustment speed and further values such as in particular the web length between the two cylinders 4, 5 and the web length between the first cylinder 4 and the sensor 7, and the measurement value can thus be corrected by this measurement error. It is hereby possible that a register adjustment also in the case of a web-cylinder measurement results in a quality identical to that in the case of a web-web measurement in which the printing cylinder prints marks onto the material web 2 and the marks are compared with one another.

In summary, the invention relates to a method for correcting a measurement value of a reference mark on a material web. The invention further relates to a controller, a machine, a computer program and a computer program product, which can perform a correction of this type. In order to improve the determination of the position of a reference mark on a material web, a machine in which a material web is moved in a conveying direction, and the machine comprises a first tool that functions in a non-positive locking manner, a second tool that functions in a non-positive locking manner and is located downstream of the first tool in the conveying direction, at least one sensor that is located between the first tool and the second tool for measuring a reference mark on the material web, a controller configured to record a measurement value between the first tool and the second tool, wherein an adjustment of the second tool results in the measurement value having a measurement error, to determine the measurement error via parameter values of the second tool, and correct the measurement value by the measurement error.

While the invention has been illustrated and described in connection with currently preferred embodiments shown and described in detail, it is not intended to be limited to the details shown since various modifications and structural changes may be made without departing in any way from the spirit and scope of the invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for correcting a measurement value of a reference mark on a material web, the method comprising:
   moving the material web in a conveying direction through a machine having a first tool that functions in a non-positive locking manner and a second tool that functions in a non-positive locking manner and is located downstream of the first tool in the conveying direction;
   adjusting the second tool which results in the measurement value having a measurement error;
   recording the measurement value from a sensor located between the first tool and the second tool of a reference mark on the material web;
   determining the measurement error via parameter values of the second tool;
   correcting the measurement value by the measurement error;
   recording at least a further measurement value downstream of the second tool in the conveying direction, wherein an adjustment of the second tool results in the further measurement value having a further measurement error;
   determining the further measurement error via the parameter values of the second tool; and
   correcting the further measurement value by the further measurement error.

2. The method of claim 1, wherein at least the second tool has at least one cylinder or one roller and a radius and a rotational speed from the at least one cylinder or one roller are used as the parameter values.

3. A computer program embodied in a non-transitory computer readable medium, wherein the computer program, when loaded into a controller and executed in the controller, causes the controller to execute a method as set forth in claim 1.

4. A computer program product embodied in a non-transitory computer readable medium, said computer program product comprising at least one computer program, that when executed in a controller performs a method as set forth in claim 1.

5. A controller for a machine, wherein the controller is configured to:
   control the machine to move a material web in a conveying direction through the machine having a first tool that functions in a non-positive locking manner and a second tool that functions in a non-positive locking manner and is located downstream of the first tool in the conveying direction;
   record a measurement value of a reference mark on the material web, the measurement value measured by a sensor that is located between the first tool and the second tool, wherein an adjustment of the second tool results in the measurement value having a measurement error;

determine the measurement error via parameter values of the second tool;

correct the measurement value by the measurement error;

record at least a further measurement value downstream of the second tool in the conveying direction, wherein an adjustment of the second tool results in the further measurement value having a further measurement error;

determine the further measurement error via the parameter values of the second tool; and correct the further measurement value by the further measurement error.

6. A machine in which a material web is moved in a conveying direction, the machine comprising:

a first tool that functions in a non-positive locking manner;

a second tool that functions in a non-positive locking manner and is located downstream of the first tool in the conveying direction;

at least one sensor that is located between the first tool and the second tool for measuring a reference mark on the material web; and a controller configured to:

record a measurement value between the first tool and the second tool, wherein an adjustment of the second tool results in the measurement value having a measurement error;

determine the measurement error via parameter values of the second tool;

correct the measurement value by the measurement error;

record at least a further measurement value downstream of the second tool in the conveying direction, wherein an adjustment of the second tool results in the further measurement value having a further measurement error;

determine the further measurement error via the parameter values of the second tool; and correct the further measurement value by the further measurement error.

* * * * *